United States Patent [19]

Avar et al.

[11] 4,330,817
[45] May 18, 1982

[54] PROCESS AND SYSTEM FOR CONTROLLING THE ENERGIZATION OF A LOAD

[75] Inventors: Zoltán Avar; Lajos Salavetz, both of Budapest, Hungary

[73] Assignee: Epitogepgyarto Vallalat, Budapest, Hungary

[21] Appl. No.: 82,062

[22] Filed: Oct. 5, 1979

Related U.S. Application Data

[63] Continuation of Ser. No. 857,750, Dec. 5, 1977, abandoned.

[30] Foreign Application Priority Data

Dec. 6, 1976 [HU] Hungary .................................. EI 718

[51] Int. Cl.³ ........................ H02P 13/18; H02M 5/45
[52] U.S. Cl. ........................................ 363/96; 363/37; 363/138; 318/801; 318/808; 318/811
[58] Field of Search .................................... 363/27–28, 363/34–37, 41, 85, 87, 95–96, 135–138; 318/341–342, 345 R, 345 E, 345 G, 801, 803, 807–808, 811

[56] References Cited

U.S. PATENT DOCUMENTS

| | | | |
|---|---|---|---|
| 3,321,697 | 5/1967 | Etter | 318/811 |
| 3,392,316 | 7/1968 | Salihi | 318/811 |
| 3,704,403 | 11/1972 | Gillett | 318/811 |
| 3,781,645 | 12/1973 | Grom et al. | 363/138 |
| 3,792,339 | 2/1974 | Kublick | 363/135 |
| 3,820,003 | 6/1974 | Tappeiner et al. | 363/41 |
| 3,935,528 | 1/1976 | Brenneisen et al. | 363/79 |
| 3,939,387 | 2/1976 | Maeda | 363/34 X |
| 4,080,554 | 3/1978 | Nordby | 318/808 |

OTHER PUBLICATIONS

A. Schönung & H. Stemmler, "Geregelter Drehstrom-Umkehrantrieb mit Gesteuertem Umrichter nach dem Unterschwingungsverfahren", Brown Boveri Mitteilunger, Aug./Sep. 1964, vol. 51, pp. 555-577.

*Primary Examiner*—William M. Shoop
*Assistant Examiner*—Peter S. Wong
*Attorney, Agent, or Firm*—Karl F. Ross

[57] ABSTRACT

In order to energize a load with an output current generally conforming to a control voltage, trains of firing pulses are alternately applied during respective conduction intervals of a recurrence period to a pair of main thyristors connected to opposite terminals of a balanced power supply which may be a DC source. The main thyristors are quenched, at the ends of their respective conduction intervals, by ancillary thyristors which lie in series with a resonant circuit including a commutating capacitor and alternately receive firing pulses in continuous succession in order to keep that capacitor operatively connected at all times to one or the other terminal of the power supply. The transmission of firing pulses to the several thyristors is timed by a logic circuit under the control of a comparator to which the control voltage is fed together with a sawtooth voltage establishing the aforementioned recurrence period.

21 Claims, 14 Drawing Figures

PROCESS AND SYSTEM FOR CONTROLLING THE ENERGIZATION OF A LOAD

This is a continuation of application Ser. No. 857,750, filed Dec. 5, 1977, now abandoned.

FIELD OF THE INVENTION

Our present invention relates to a process and a circuit arrangement for controlling the energization of a load, especially for the continuous control of the speed of an AC motor, by an output current generally conforming to a predetermined control voltage of any desired shape.

BACKGROUND OF THE INVENTION

It is a well-known fact that the price of AC motors is about half that of commutator DC motors with similar power, but at the same time such AC motors are more reliable and have a longer useful life than DC motors.

An advantage of DC machines, compared to AC motors, is that their speed and torque can be controlled over a wide range; they can be operated not only as motors but also as generators, in which case they apply a braking torque to the driving shafts and supply energy, which is equivalent to the driving shafts and supply energy, which is equivalent to the braking power, back to the current-supply network.

For the most part, thyristor rectifiers are used nowadays to supply DC machines. The output voltage of the thyristor rectifiers increases at the moment of firing. As a result there is a pulsating alternating voltage superimposed on the direct voltage.

This alternating component of the supply voltage increases considerably the load of commutator DC machines. Thus, they must be made more robust (i.e. overdimensioned) in order to prevent damage due to these effects.

The above-mentioned advantages of AC motors cannot be utilized when continuous speed and power regulation is necessary.

Variable three-phase output voltage and frequency from static frequency changers are already being used to drive electrical AC motors.

A similar approach is described by Sandor Marti and Dr. Laszlo Nagy in "The Optimization of I.F. Thyristor Frequency Changers to Supply Grinding-Wheel Motors" (Villamosság Vol. 21, No. 7, pp. 216-218, July 1973). According to this article, the variable frequency and amplitude of the three-phase output signal is produced in two stages. First, a variable direct voltage is generated by a rectifier controlled by the three-phase network, and then this direct voltage is converted into alternating voltage of the required frequency by using a three-phase inverter. The amplitude of the output voltage is controlled by the direct voltage fed to the inverter, and the frequency is controlled by changing the recurrence rate of the firing pulses supplied to its thyristors.

This approach is basically similar to the inverter of Brown Boveri and CIE (BBC) named VERITRON. Its description can be found in their catalogue D GHS 309320.

Owing to the non-sinusoidal character of the alternating voltage produced by said inverters, the pace of electric motors driven thereby is rough, especially at low frequencies. As a result of the non-sinusoidal supply, the noise level of the motors increases and their running is unfavorable from all points of view in comparison with a motor supplied with a sinusoidal current. During each switching cycle, the thyristors or controlled rectifiers become abruptly conductive so that a filter element should be installed between the inverter and the load to smoothen the output current.

The controlled rectifiers operate on the principle of phase-splitting. Therefore, each network phase conducts only in certain periods of a cycle whose width determines the rectified mean power and, after filtering, the magnitude of the direct voltage available.

The pulsating loading of the three-phase network requires a phase-compensating stage to be inserted between the network and the inverter to protect the network. The costs and sizes of the phase-compensating stage and the filter element are comparable to those of the rest of the frequency changer, especially for high-power units.

In another inverter of Brown Boveri and CIE, described in their catalogue G3A 6019, the thyristors are not switched in the cadence of the output frequency but in the cadence of clock pulses, the frequency of the latter being an integral multiple of the frequency of the output signal. The frequency of the clock pulses is fixed relative to the frequency of the output. A substantially sinusoidal output is produced by comparing the triangular clock pulses to a suitable direct voltage. As a result of this comparison there are generated in each phase a certain number of control pulses during each semiperiod of the basic frequency. The average energy of the control pulses of different width, separated by intervals of de-energization, approximates the energy distribution of the sinusoidal load current. In the control system described in the catalogue mentioned above, the semiperiods of the quasi-sinusoidal output signal encompass three pulses which appears incompatible with satisfactory and steady operation of a motor. Such a system also limits the frequency of the output signal to certain submultiples of the basic clock frequency.

A more elaborate inverter, in which each phase of a three-phase motor is energized by several thyristors in parallel whose conduction is timed by relatively staggered triangular pulse trains, has been described in an article by A. Schönung and H. Stemmler published in BROWN BOVERI MITTEILUNGEN of August-/September 1964, Vo. 51, pages 555-577.

Different thyristor-control means for industrial motors are summarized in the catalogue of ASEA of Sweden No. 8297 Ta.

U.S. Pat. No. 3,935,528 describes an inverter with a commutation circuit which comprises a series-resonant network, including a commutating capacitor and an inductance, connected to the midpoint of a balanced DC supply whose positive and negative terminals feed a load via respective circuit branches each including a main thyristor in antiparallel relationship with a respective diode. Two antiparallel ancillary thyristors are inserted between a junction of these branch circuits and the series-resonant network. The two main thyristors conduct in respective intervals of a clock cycle or recurrence period, these intervals being spaced apart sufficiently to prevent simultaneous conduction which would short-circuit the supply. The conduction interval of either main thyristor is terminated by the firing of a respective ancillary thyristor, lying in bucking relationship therewith, which remains conductive only during part of the conduction interval of the other main thyristor. As long as one of the ancillary thyristors conducts, the commutating capacitor reverses its charge via the conducting main thyristor of one circuit branch or the diode of the other branch.

OBJECTS OF THE INVENTION

In a commutation circuit of the type just referred to, failure of the commutating capacitor to acquire a sufficient charge during conduction of one ancillary thyristor could prevent the timely quenching of the overlappingly conducting main thyristor when the other ancillary thyristor is subsequently fired. Thus, our invention aims at obviating the risk of malfunction in a converter system in which a control voltage is used to vary the relative widths of the conduction intervals of the two main thyristors of such a commutation circuit for the purpose of energizing a load with an output current generally conforming to that control voltage.

A more particular object of our invention is to provide a converter system adapted to be used for both DC/AC and AC/DC conversion.

SUMMARY OF THE INVENTION

Pursuant to our present improvement, the ancillary thyristors of a commutation circuit as described above are alternately turned on in continuous succession to keep the commutating capacitor at all times operatively connected to a terminal of the associated power supply. Thus, where a first main thyristor conducts in the first interval of a recurrence period and is quenched by a first ancillary thyristor whereas a second main thyristor conducts during a second interval and is quenched by a second ancillary thyristor, this second ancillary thyristor is supplied with a train of firing pulses from the beginning of the recurrence period to an intermediate instant thereof which marks the end of the first interval, the first ancillary thyristor being supplied by a train of firing pulses from that intermediate instant to the end of the recurrence period which coincides with the end of the second interval. In this way, even when one of these conduction intervals is relatively short, the commutating capacitor will always have enough time to acquire the necessary charge.

Advantageously, the clock pulses are generated by a sawtooth oscillator working into a comparator which confronts the sawtooth voltage with the control voltage and, in a manner known per se, causes a switchover at a time—corresponding to the aforementioned intermediate instant—when a rising flank of the sawtooth voltage reaches the instantaneous value of the control voltage. In accordance with a more particular feature of our invention, the occurrence of such a match is detected by logical circuitry to which three timing pulses are fed from the comparator, i.e. a timing pulse A generated from the intermediate instant to the end of the rising flank of the sawtooth voltage, a timing pulse B generated from the beginning to the end of that rising flank, and a timing pulse C generated as a replica of pulse A delayed by a small fraction of a recurrence period. From these three timing pulses the logical circuitry derives four gating signals enabling the transmission of a train of firing pulses to the respective thyristors, these firing pulses having a cadence substantially higher than that of the clock pulses.

SPECIFIC DESCRIPTION

Figure 1:
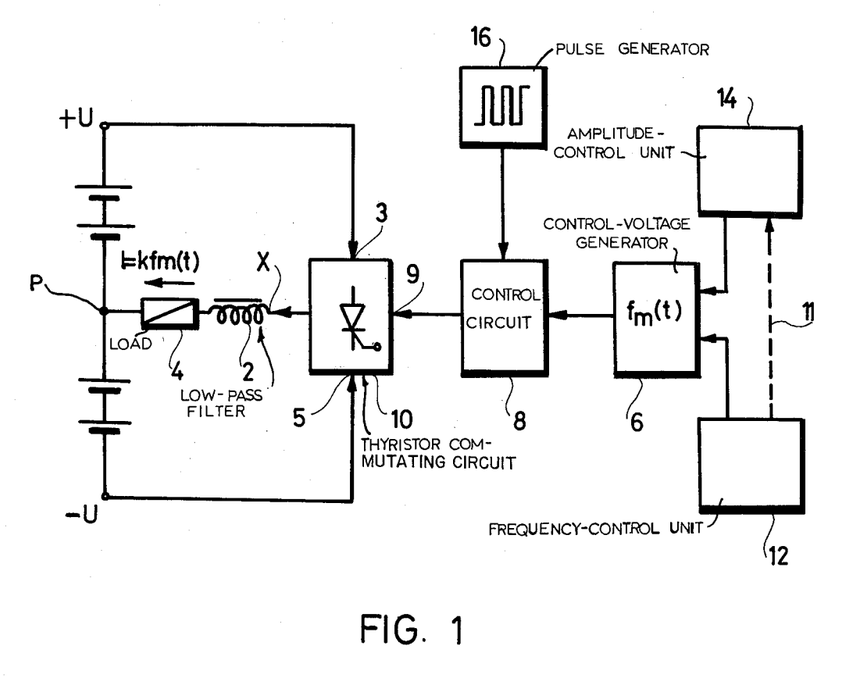
FIG. 1 is a simplified block diagram of a converter according to our invention for one phase.

FIG. 1 shows a converter according to our present invention which comprises a thyristor commutating circuit 10, a low-pass filter, and a load 4 all connected in series. The low-pass filter is shown as a separate inductive coil 2 but that inductance may also be part of the load 4 itself. Inputs 3 and 5 are respectively connected to positive and negative terminals $+U$, $-U$ of a balanced direct-current supply shown as a battery. The absolute values of the two terminal voltages relative to a reference point P are equal and constant during operation.

The thyristors in the switched-on branches of the commutating circuit 10 are fired by a control circuit 8 connected to a pulse generator or oscillator 16 and to a control-voltage generator 6. The frequency of the output signal of the control-voltage generator 6 is determined by a unit 12 while the amplitude of the same signal is determined by a control unit 14. The frequency-adjusting unit 12 and the amplitude-adjusting unit 14 can be interconnected by a line 11 if it is necessary to modify the amplitude of the control voltage in accordance with its frequency.

The inverter presented here converts any given direct voltage into sinusoidal excitation of variable amplitude and frequency for the load 4 or, more generally, into an energizing current conforming to a specified transfer function $f_m$ according to the control voltage emitted by generator 6.

The thyristors of the commutating circuit 10 are rendered conductive under the control of clock pulses emitted by generator 16. The magnitude and sign of the load current is determined by the ratio of the durations of positive and negative current flow in consecutive intervals of each clock cycle.

Figure 2:
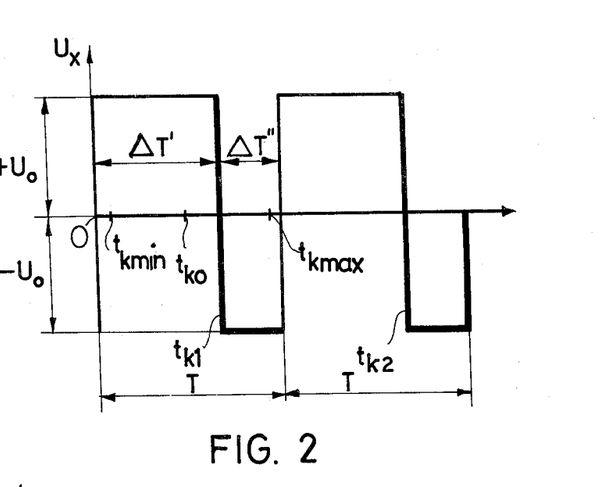
FIG. 2 is a graph of amplitude (ordinate) versus time (abscissa) of the voltage at a terminal X in the system of FIG. 1.

FIG. 2 shows the voltage $U_x$ at the output terminal X of the commutating circuit 10 in two consecutive clock cycles.

When the time t is between $t=0$ and $t=t_{k1}$, terminal X is connected to the input 3 so as to carry positive voltage for an interval of duration $\Delta T$. At the moment $t=t_{k1}$ the terminal X is switched to input 5, i.e. to negative voltage. At the end of a clock cycle T there is another switchover terminating a negative pulse which lasts for an interval of duration $\Delta T'' = T - \Delta T'$.

The commutating instants $t_{k1}$, $t_{k2}$ ... in each clock cycle are determined by the momentary value of control function $f_m$ at the output of voltage generator 6 in such a way that when the signal $f_m$ is zero, the switchover takes place at the midpoint $t_{k0}$ of a cycle so that $\Delta T' = \Delta T''(T/2)$, i.e. the positive and negative pulses are symmetrical. Theoretically the commutating instants $t_k$ could occur anywhere between 0 to T but practical considerations dictate the establishment of lower and upper limits $t_{kmin}$, $t_{kmax}$.

For the duration of positive pulses we have:

$$\Delta T' = (T/2) + (T/2)f_m(t) = (t/2)[1 + f_m(t)]$$

for the duration of negative pulses we have:

$$\Delta T'' = (T/2) - (T/2)f_m(t) = (T/2)[1 - f_m(t)]$$

We assume that the control function $f_m(t)$ is of limited bandwidth and its highest frequency is smaller than one quarter of the clock frequency, i.e. $f_{max} < 1/4T$, its amplitude being between 0 and 1.

The potential $U_x$ of terminal X can be given in tabulated form as follows:

$$U_x(t) = + Uif nT < t < (nT + \Delta T')$$

$$U_x(t) = - Uif (nT + \Delta T') < t < (n+1)T$$

where n = 1,2,3 ... (a positive integer).

Commutation occurs, therefore, at the beginning of each clock cycle and at the instant $t_k$ of switchover within each cycle, thus at times $t = nT$ and $t = (T/2)[1 + f_m(nT)]$. This neglects the slow change of the control function $f_m$ during the interval $\Delta T'$, considered insignificant.

In practice the function $f_m$ is a sine wave, the generator 6 of FIG. 1 emitting a sinusoidal voltage whose amplitude and frequency are respectively determined by units 14 and 12.

Figure 3A:
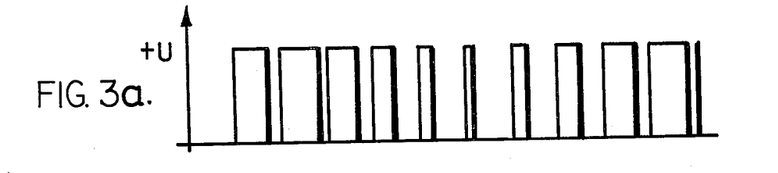
FIGS. 3a–3c are timing diagrams of width-modulated positive and negative voltage pulses and a resulting output current, respectively.
Figure 3B:
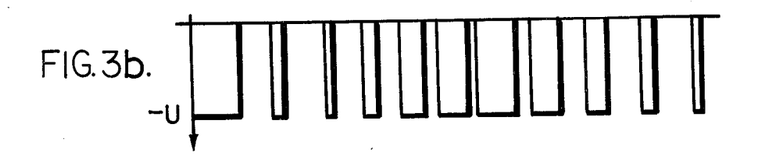

The chosen commutating system shows a close analogy to pulse-duration modulation (PDM) used in signal-transmission techniques, except for the alternation of pulses of opposite polarity whose combined width is constant. In FIGS. 3a and 3b the two interleaved pulse series at terminal X are shown for one cycle of the sinusoidal control voltage $f_m$.

Figure 3C:
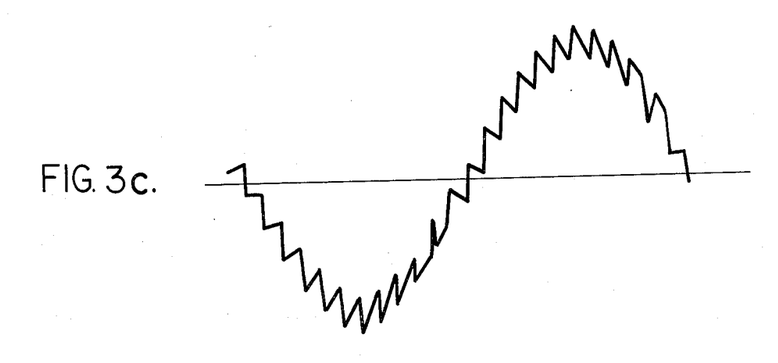

In FIG. 3c the current flowing through the load 4 is shown. This graph is based on the observation on an oscilloscope of an actual circuit. The cycle length of FIG. 3c is chosen to be less than that of FIGS. 3a and 3b to represent the phenomenon more realistically.

It is clear that the current traversing load 4 and coil 2 consists of exponentially increasing and decreasing sections in each clock cycle or recurrence period, the magnitude of its change being proportional to the difference of the duration of positive and negative pulse intervals $\Delta T'$, $\Delta T''$. The inductivity of the load circuit ensures that although the value of the current is fluctuating, its direction remains unchanged in each clock cycle in spite of the variable voltage supplied. These fluctuations are very short compared to the cycle of the control voltage. Thus, the resultant current approximates an ideal sinusoidal shape. The higher the clock-pulse cadence, the better the approximation. This cadence is limited by the operating speed of available switches.

Figure 4:
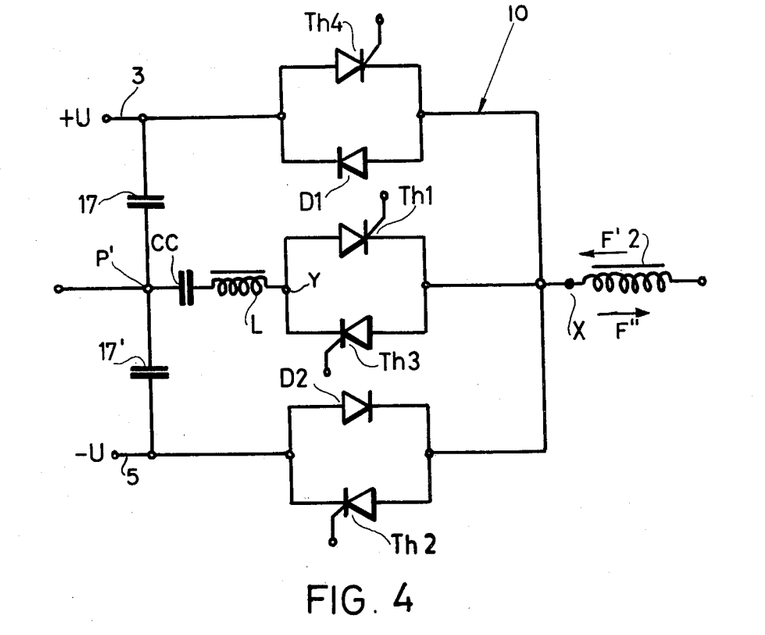
FIG. 4 shows details of a commutating circuit illustrated in block form in FIG. 1.

In FIG. 4 the commutating circuit 10 is shown in detail. The main circuit components are a thyristor Th4 with an antiparallel diode D1 in the positive branch and a thyristor Th2 with an antiparallel diode D2 in the negative branch. The thyristors Th4 and Th2 are quenched by a series-resonant network, consisting of an inductance L and a capacitance CC, and by ancillary thyristors Th1 and Th3 which are connected in antiparallel relationship between terminal X and a point Y; the latter is separated by resonant network L, CC from the junction P' of two capacitors 17, 17' which is virtually at zero potential corresponding to that of point P (FIG. 1). The commutating circuit shown in FIG. 4 is well known per se, e.g. from U.S. Pat. No. 3,935,528.

It is essential that thyristor Th4 should be already extinguished at the instant when thyristor Th2 becomes conductive, and vice versa. To ensure this, the firing of thyristor Th2 is somewhat delayed with reference to that of thyristor Th1 which extinguishes the thyristor Th4; the latter, in turn, is fired after thyristor Th3 which quenches the thyristor Th2.

Figure 5:
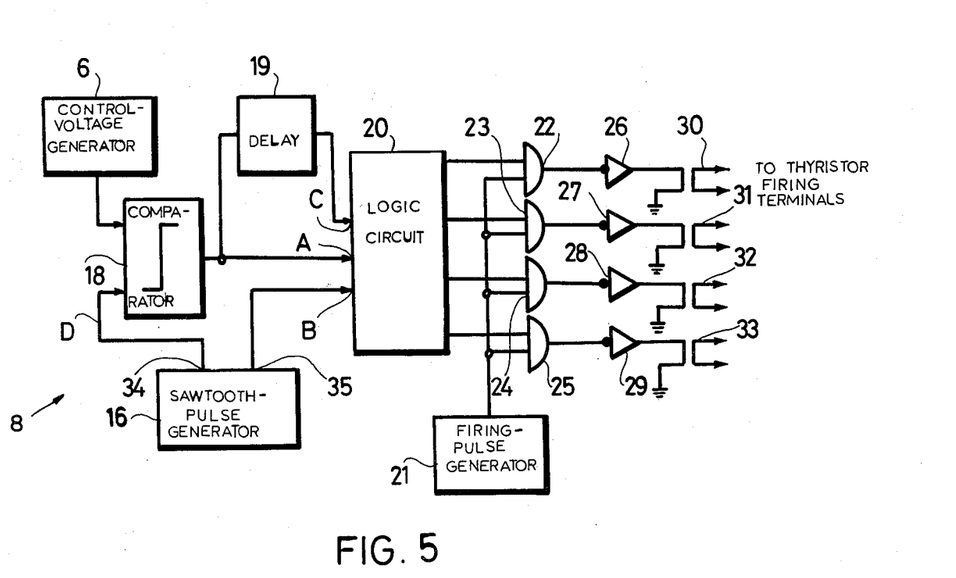
FIG. 5 shows details of a control circuit also illustrated in block form in FIG. 1.

The operation of thyristors Th1–Th4 and the practical realization of the control circuit 8 (see FIG. 1) will be described with reference to FIGS. 5 and 6.

To control the commutating circuit 10, thyristors Th1–Th4 need firing pulses which make switchover possible at instants $t_k$ in accordance with the value of the control voltage, as well as at times nT. The control-voltage generator 6 is connected to the signal input of a comparator 18 (FIG. 5) forming part of control circuit 8. The reference input of this comparator is connected to a sawtooth-signal output 34 of pulse generator 16 which supplies the clock pulses with recurrence period or cycle T. The value of control voltage $f_m$ supplied by the voltage generator 6 varies between its maximum $U_M$ and minimum (see FIG. 6). The output of comparator 18 is connected to an input A of a logic circuit 20 and to the input of a delay element 19. The output of the delay element 19 is connected to the input C of the logic circuit 20. Another output 35 of the pulse generator 16 is connected to a pulse input B of the logic circuit 20.

Four firing transformers 30–33, each belonging to one of the four thyristors, receive pulse trains of a cadence much higher than that of the clock pulses from a firing-pulse generator or oscillator 21 through respective AND gates 22–25 and power amplifier/inverters 26–29. The transmission of the firing pulses is enabled by the gating signals from logic circuit 20.

The functioning of the control circuit shown in FIG. 5 will be explained with reference to FIG. 6. The pulse generator 16 supplied linearly ascending, then suddenly descending sawtooth signals (waveform D) in accordance with the clock-pulse cadence and yields rectangular timing pulses B of logical value 1 on the ascending flanks of the sawtooth signals. These rising flanks start at instants t' and end at instants t''.

The sawtooth signals D are confronted in comparator 18 with control voltage $f_m$ to produce a pulse of logical value 1 when the amplitude of sawtooth signal D is greater than the value of control voltage $f_m$. In FIG. 6 the sawtooth signal D is equal to the value of control voltage $f_m$ at instant $t_{k1}$ at which time a timing pulse A appears at the comparator output. Comparison starts again in the next cycle where the beginning of pulse A coincides with instant $t_{k2}$. The control voltage $f_m$ passes through zero at the midpoint $t_{k0}$.

The more positive the instantaneous value of control voltage $f_m$, the later this coincidence will occur; the width of pulse A is thus inversely proportional to this instantaneous value. Since the clock frequency is much higher than the frequency of control voltage $f_m$, the value of the latter can be considered constant within each clock cycle.

The timing pulses A at the output of comparator 18 are retarded in circuit 19 by a small fraction of cycle T so that delayed timing pulses C will appear at the output of circuit 19. In FIG. 6 a pulse C is shown by dotted lines as overlapping the pulse A. The delay depends on the type of thyristor used and should be chosen in accordance with the time required for its safe extinction.

The firing pulses for the thyristors are supplied by the oscillator 21 in the form of high-frequency spikes. These firing pulses reach the control electrodes of the thyristors Th1–Th4 through the inverters 26–29 and transformers 30–33 when the AND gates 22–25 conduct in the presence of the gating signals appearing at the outputs of the logic circuit 20.

The logic circuit 20 derives the various gating signals for the several thyristors from the timing pulses A, B and C received by it. These gating signals are given by the following Boolean equations:

$\overline{A} \cdot B$ for thyristor Th4,
$B + B \cdot \overline{A}$ for thyristor Th3,
$B \cdot C$ for thyristor Th2
and
$A \cdot B$ for thyristor Th1.

Figure 6:
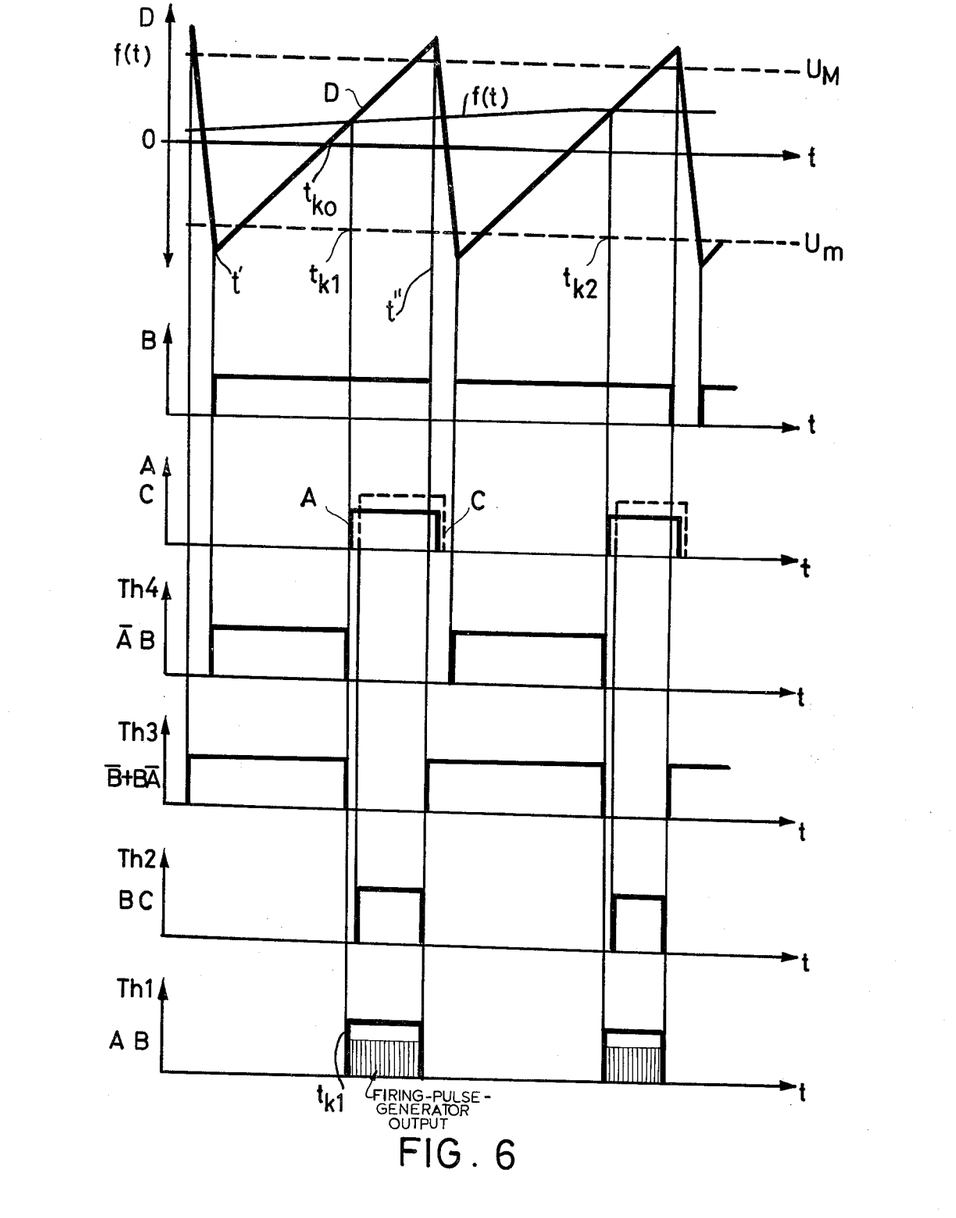
FIG. 6 is a set of graphs showing the waveforms of voltages measured at specific points of FIG. 5.

In FIG. 6 all four gating signals are shown. In the bottom graph, relating to thyristor Th1, we have also indicated the firing pulses passed by the corresponding AND gate.

In each clock cycle, thyristor Th4 conducts from instant $t'$ to instant $t_k$ when it is extinguished by the firing of thyristor Th1 which discharges the capacitor CC of the resonant network L, CC via diode D1 in the known manner; since thyristor Th2 receives its first firing pulse not at instant $t_k$ but after a predetermined delay introduced by circuit 19, the two main thyristors Th4, Th2 cannot be switched on simultaneously. Quenching of thyristor Th2 is started by the firing of thyristor Th3 at the end of the ascending section of the sawtooth signal, i.e. at instant $t''$.

As is apparent from the foregoing Boolean equations, as well as from FIG. 6, the transmission of firing pulses to ancillary thyristor Th1 and to main thyristor Th2 terminates simultaneously at instant $t''$, i.e. upon the resumption of firing-pulse transmission to the other ancillary thyristor Th3. The latter, in turn, receives firing pulses up to the instant $t_k$, thus to the end of the conduction period of main thyristor Th4 which ends with the renewed firing of ancillary thyristor Th1 connected in bucking relationship therewith. Commutating capacitor CC, therefore, can be negatively charged from input 5 via neutral point P' and ancillary capacitor 17 as long as thyristor Th2 is conducting; thyristor Th1, turned on during the same period, will of course carry current only as long as there is a potential difference of the proper polarity between points X and Y. Similarly, capacitor CC can be positively charged from input 3 via neutral point P' and ancillary capacitor 17' as long as thyristor Th4 is conducting since thyristor Th3—bucking the main thyristor Th2—is turned on at the same time. When both main thyristors are cut off, thyristor Th1 or Th3 keeps the capacitor CC connected to one of the supply terminals 3, 5 via diode D2 or D3, respectively.

If the control function is a direct voltage, the output signal will also be a direct voltage proportional to the controlling voltage. In the case of direct-voltage control, a high-power DC/DC converter including the commutating circuit of FIG. 4 can efficiently translate the constant supply voltage into a continuous output voltage of selected magnitude. In this case we use a stabilized source of adjustable voltage in place of the control-voltage generator 6.

Figure 7:
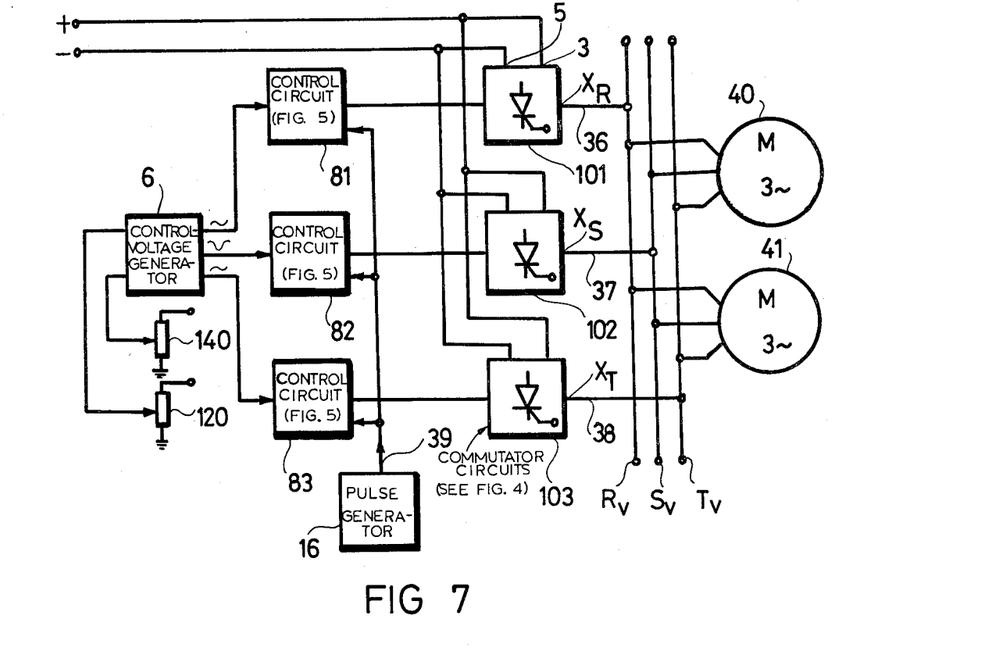
FIG. 7 is a block diagram of a converter according to our invention for supplying a three-phase network.

FIG. 7 shows the block diagram of a three-phase converter which is constructed according to the principles mentioned above. This system produces a three-phase voltage of variable amplitude and frequency from a direct voltage applied to its input.

There are three commutating circuits 101, 102 and 103, similar to the one shown in FIG. 4, each working into a respective phase conductor $R_v$, $S_v$ and $T_v$. Three control circuits 81, 82 and 83 associated with the commutating circuits are similar or equivalent to the circuit 8 shown in FIG. 5. The control circuits 81, 82 and 83 receive the clock pulses of constant frequency from a common pulse generator 16 through a line 39, their control inputs being connected to separate outputs of the control-voltage generator 6 here emitting a three-phase sinusoidal control voltage. Unit 6 can be, for example, a small mechanically driven three-phase generator. In this case, the control voltage depends on the speed of the generator, i.e. on the frequency, and in certain frequency ranges this dependence is similar to the frequency dependence of the nominal voltage of conventional three-phase motors. We prefer to make the control-voltage generator 6 from electronic circuits without using rotating machines. The frequency of the three sinusoidal output voltages, which are relatively phase shifted by 120°, can be controlled by the potentiometer 120 within a wide range, say from 5 Hz to 150 Hz, according to the desired frequency. Since in the commutating system the output signal follows the waveform of the control voltage, the value of the output voltage can also be modified by varying the amplitude of the control voltage by the amplitude-adjusting potentiometer 140.

The operation of the circuit arrangement shown in FIG. 7 is based on commutation in accordance with the aforedescribed double duration-modulated pulse series. The commutating circuits 101, 102 and 103 are periodically switched on and off by the clock-pulse frequency which is higher than the desired output frequency. The ratio of the positive and negative conductive periods is again determined by the instantaneous value of the applied control voltage; thus, the currents flowing through the output lines 36, 37 and 38, which are connected to points $X_R$, $X_S$ and $X_T$, follow the waveform of the control voltage apart from minor fluctuations of a frequency corresponding to the clock-pulse cadence. In FIG. 7 the loads are shown as asynchronous motors 40 and 41. Since such motors also work as filters, there is no need to use inductances such as the coil 2 shown in FIG. 1. The terminal voltage of the motors has the waveform shown in FIGS. 3a and 3b.

The current flowing through the motors 40, 41 has a waveform similar to that generated by ideal sinusoidal voltages so that the running of the motors is steady and quiet even at lower speeds. The speed of the motors 40, 41 can be set continuously within the control range by the frequency-adjusting potentiometer 120 and by the amplitude-adjusting potentiometer 140.

To operate the circuit arrangement shown in FIG. 7, a variable voltage source is not required. This circuitry loads the DC network more favorably than conventional inverters, the sinusoidal motor current providing a uniform load for the commutating circuits. When the clock-pulse frequency is high compared to that of the three-phase current, about 500–800 Hz, the energy drawn from the DC supply during one cycle is relatively small so that the high-frequency load-current fluctuations can be equalized by suitable filter capacitors. Filtering is simplified because the frequency of the clock pulse is constant and independent of the output frequency so that even a resonant filter can be utilized.

Figure 8:
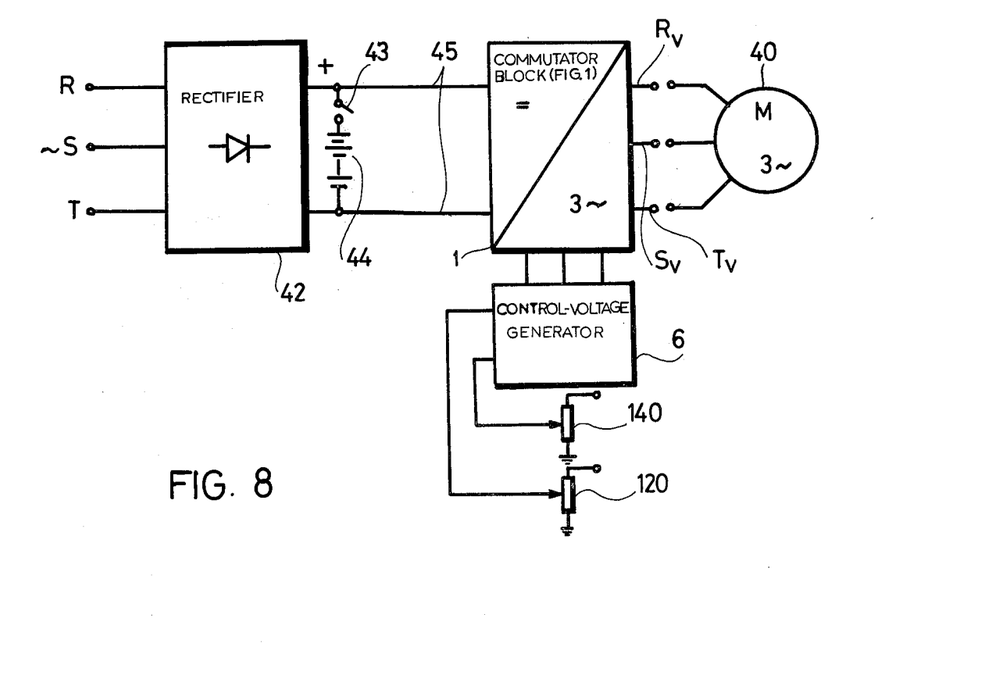
FIG. 8 is a simplified block diagram of a motor-control system including the converter of FIG. 7.

Below we shall describe various uses and features of the present invention. In FIG. 8 the converter according to our present invention is represented by a single block 1 which basically contains the circuitry shown in FIG. 7.

The block 1 in FIG. 8 again converts direct voltage to alternating voltage. The direct voltage necessary for its operation is supplied by a rectifier current 42 from the three-phase network R,S,T and is fed to the block 1 through a DC bus 45. A battery pack 44 is connected to the direct-current bus 45 through a switch 43. The rated voltage of bus 45 can vary, depending on utilization, but a direct voltage of 550–600 volts is the most suitable.

The output current of the block 1 is determined by the three-phase control voltage supplied by generator 6. The characteristics of the three-phase control voltage can be set by the adjusting potentiometers 120 and 140.

In response to this control voltage the block 1 delivers a sinusoidal exiting current to the output phase lines $R_v$, $S_v$ and $T_v$; block 1 can therefore be considered, from the point of view of motor 40 or any other loads, as a three-phase source whose frequency and amplitude can be adjusted within wide ranges by the potentiometers 120 and 140. Such a source of variable frequency and amplitude expands the utilization of three-phase asynchronous motors because it makes continuous control of speed and torque possible. This is also advantageous with linear motors because their speed can be continuously adjusted by controlling the frequency. Up to now, speed control of linear motors was achieved by adjusting the load or by polarity reversals, but these expedients were not very practical.

A fundamental characteristic of block 1 is that it can be operated in a recuperative mode. This means that AC motors so connected can be operated in a four-quadrant mode. If motor 40 is driven by an external torque it will operate as a generator, i.e. it will recuperatively feed three-phase energy to block 1. This energy will be rectified by block 1 and transferred to the direct-current bus 45. Since conventional rectifiers are not capable of returning this energy to the supply network R,S,T, it can be used for charging the batteries 44.

The inverse mode of operation of block 1 is also based on commutation, controlled by a double duration-modulated pulse series. The retarding effect in the braking mode of operation can be increased by decreasing the control frequency. With a given frequency the braking torque varies as a function of the control amplitude; the higher the amplitude, the greater the braking torque will be. Because of this, the lowering speed of cranes can be adjusted to the required value with widely different loads and a significant part of the braking energy can be recovered.

The inverse mode of operation of the commutating circuitry can be understood from the aforedescribed control technique and by referring to FIG. 4. Let us assume that current is flowing during one half-cycle of the control voltage in the direction of arrow F' from the load toward the commutating circuit. In each clock cycle thyristors Th4 and Th2 are consecutively triggered by firing pulses. In the positive commutation interval $\Delta T'$ (FIG. 2), current flowing in the direction of arrow F' can freely flow back through diode D1 to the positive pole 3 of the voltage supply while charging the battery connected thereto. Upon the firing of thyristor Th2 at the beginning of the negative interval $\Delta T''$, terminal X is connected to the negative pole 5 of the voltage supply so that diode D1 is reverse-biased. By this time thyristor Th4 has been cut off. The current flowing in the direction of arrow F' charges the battery (or capacitor 17') connected to the negative supply terminal 5. If the durations of these two commutation intervals are equal, the energy of the battery pack 44 is unchanged over the whole clock cycle inasmuch as the energy taken out is equal to the energy recovered. But since ratio $\Delta T'/\Delta T''$ follows the specified control voltage, the mean current flow is not zero but corresponds to a predetermined unipolar voltage. The frequency of the three-phase control voltage is the same as that of the three-phase current transmitted to block 1.

In the other half-cycle of the control voltage, when current flows in the direction of arrow F'' from the block 1 toward the load, the roles of the diodes D1 and D2 and those of the thyristors Th4 and Th2 are interchanged so that the polarity of the mean current flow is again such as to charge the battery pack 44. Since the voltage of the direct-current bus 45 is usually around 550–600 volts, the use of such a battery pack is not always economical.

Figure 9:
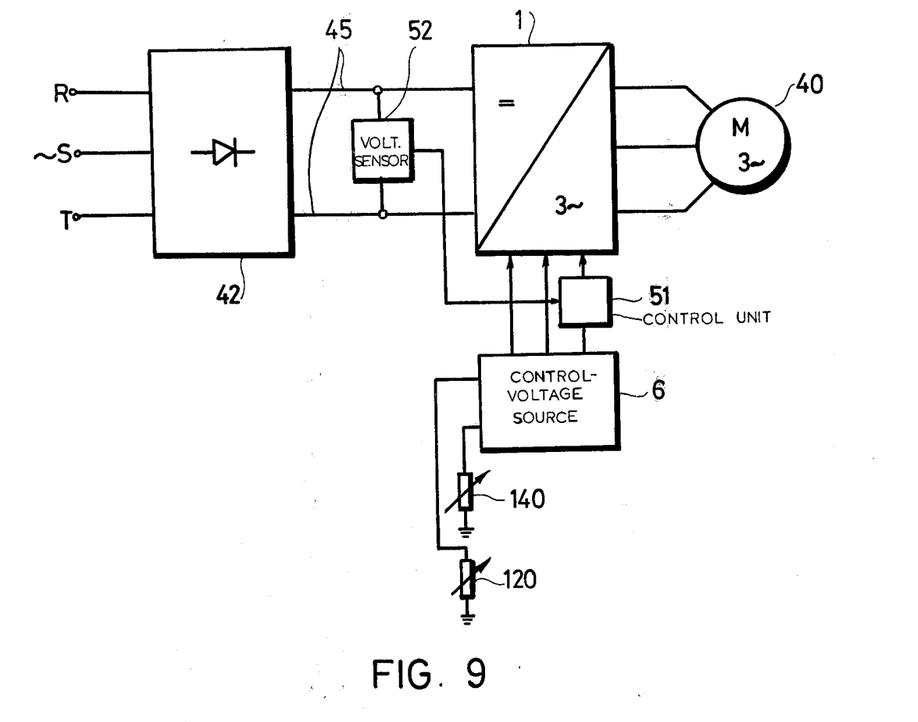
FIG. 9 is a block diagram of a modification of the system of FIG. 8.

In FIG. 9 we have shown a circuit arrangement similar to that of FIG. 8 wherein, however, the battery pack 44 has been omitted. Instead, a direct-current component is set up in the motor 40 by shifting the symmetry of the three-phase motor current to dissipate the direct-current energy recuperated. It is well known that if a direct-current component is set up in one of the phase windings of a three-phase motor, the magnetic field of the current will brake the motor.

In order to obtain the direct-current component, a control unit 51 is connected in series with one of the three output leads of generator 6 which supplies the three-phase control voltage to the block 1. The value of the DC component superimposed on the sinusoidal alternating voltage by this unit 51 depends on a signal voltage supplied to a control input of this unit from a voltage sensor 52 connected across the direct-current bus 45. The voltage of bus 45 increases during recuperation whereby sensor 52 transmits a control voltage to unit 51 causing a direct-current component to be superimposed on one of the phase lines emanating from block 1. This component has a braking effect on motor 40 and decreases the terminal voltage when that motor is operated in the generator mode.

Figure 9A:
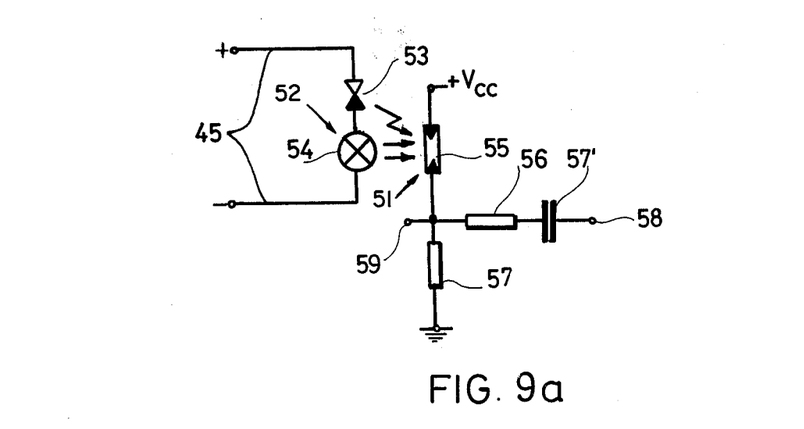
FIG. 9a is a circuit diagram of a voltage sensor and a control unit shown in FIG. 9.

A practical construction of voltage sensor 52 and control unit 51 is shown in FIG. 9a.

The voltage sensor 52 is made up of a Zener diode 53 and an electric bulb 54 connected across the DC bus 45. The voltage of the Zener diode 53 is chosen so that the illumination power of the electric bulb 54 is small when the voltage of bus 45 is equal to a specified value, e.g. 550 volts. The control unit 51 comprises a photodiode 55, which is connected in series to a resistance 57, and a capacitor 57' and a resistance 56 which are generally connected between a terminal 58 connected to the control-voltage generator 6 and the junction 59 of photodiode 55 with resistance 57. The photodiode is connected to positive supply voltage $+V_{CC}$.

The photodiode 55 is optically coupled with the electric bulb 54 and has a resistance which varies inversely with the illuminating power of the bulb 54. The sinusoidal alternating voltage from generator 6 is transmitted to the junction of the resistances 56 and 57, i.e. to the output 59. Its direct-current component is equal to zero as long as the bulb has a low luminosity which corresponds to nominal voltage. In the generator mode of operation, the voltage of the DC bus 45 increases so that the illuminating power of the bulb increases too. The resistance of the photodiodes 55 will thus be lowered so that a direct-current component proportional to the illuminating power will be superimposed on the alternating voltage at the output 59. This will shift the direct-current level of one of the phases of the three-phase voltage which controls the block 1 and will also give rise to a direct-current component in the motor 40.

In the inverse mode of operation of block 1, it can be used as a rectifier and the magnitude of the produced direct voltage is determined by the amplitude of the control voltage within a wide range.

Figure 10:
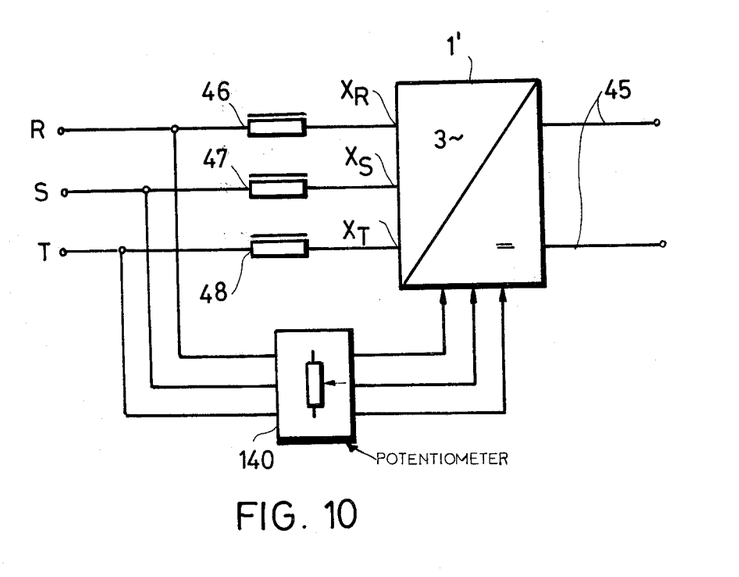
FIG. 10 is a block diagram of an AC/DC converter according to the present invention.

The block 1' shown in FIG. 10 is fundamentally the same as block 1, but its three-phase output leads are connected through chokes 46, 47 and 48 to the phase lines R, S, T of the three-phase supply network. In this arrangement the block 1' works as a rectifier delivering a controlled output voltage on bus 45. The control voltage is here supplied by the network, rather than by the generator 6 shown in FIG. 9, and the continuous output can be controlled by an amplitude-adjusting unit 140, usually a potentiometer, which is inserted in branch conductors connected between the phase lines of the network (upstream of chokes 46, 47, 48) and the control input of the block 1'. A voltage stabilizer connected to the DC bus 45 or some other source operated from network can supply the low-power direct voltage for the circuits of the control block 1'. At the moment of switching on the circuit shown in FIG. 10, the thyristors are unable to operate because the capacitors 17 and 17' in the block 1' (see FIG. 4) are not changed yet. These capacitors 17 and 17' are, however, promptly charged by the diodes D1 and D2 connecting them in a rectifier arrangement to the alternating-current side.

The rectifier system shown in FIG. 10 is much more advantageous than thyristor-controlled rectifiers working on the principle of phase-splitting because by applying a high switching frequency there are formed high-frequency low-power current shocks instead of the sudden high-power full-current shocks occurring on the cut-in and cutout of phase-splitting DC switches. These high-frequency fluctuations can be filtered by chokes 46–48 so that there is no need to current a separate phase-compensating stage of the block 1' which rectifies the control voltage. By eliminating sudden pulses, the level of all sorts of disturbances getting into the network decreases significantly.

In connection with FIG. 8 and FIG. 10 we saw that the block 1 is suitable for producing a network of variable frequency and amplitude from direct voltage or to produce variable direct voltage from alternating voltage.

In connection with FIG. 7 we mentioned that the circuit was suitable for producing a variable direct voltage as well, and in that case only one commutating circuit is necessary instead of three, with one control circuit. When the control voltage is a direct voltage, the system can be considered a DC/DC inverter.

A controlled alternating-voltage supply can also be formed from the block 1, arranged as is shown in FIG. 8, if the frequency of the control voltage is synchronized with that of the network and its amplitude is controlled by potentiometer 140. The voltage-control unit can be either a single-phase or a multi-phase device.

Figure 11:
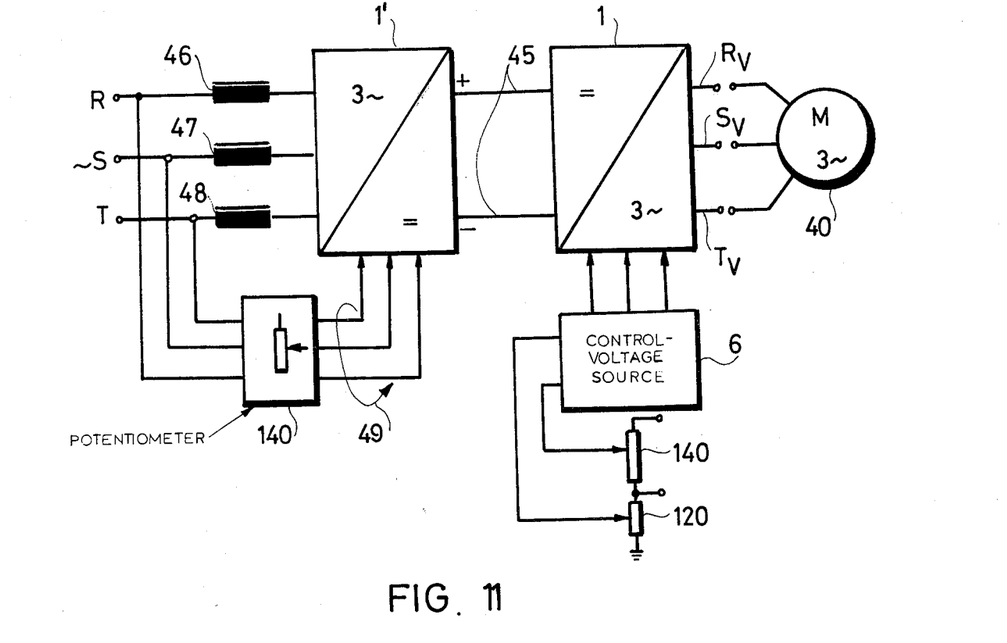
FIG. 11 is a circuit diagram of a system similar to those of FIGS. 8 and 9, using the AC/DC converter of FIG. 10.

In FIG. 11 there is shown a converter system which contains boths blocks 1 and 1'. This arrangement facilitates continuous speed and power control of AC motors supplied from a three-phase network, in a recuperative mode of operation, in all four quadrants of the speed-vs.-torque diagram, since the energy released on braking flows back to the network in the form of sinusoidal three-phase voltage synchronous with the network voltage.

The system shown in FIG. 11 corresponds to the arrangement of FIG. 8 with the only difference that the three-phase power is rectified by the circuitry shown in FIG. 10 instead of the conventional rectifier 42. Three-phase network R,S,T supplies the block 1' through branch lines 49 and the amplitude-adjusting potentiometer 140 with a three-phase control voltage which is proportional to the network voltage. As a consequence, a direct voltage appears on bus 45. Controlling the value of this direct voltage, although possible with the aid of potentiometer 140, is not necessary for operating the system.

The DC bus 45 is connected to the direct-current side of block 1 which is similar to block 1'. At the output of block 1, a three-phase voltage of variable frequency and amplitude appears and supplies the motor 40. The output frequency and voltage can again be controlled by the potentiometers 120 and 140.

The interconnection of the direct-current sides of the two similar blocks 1 and 1' enables the filter capacitors 17 and 17' also to be combined and allows the use of a common pulse generator 16 (FIG. 5) for the two blocks.

The system of FIG. 11 is suitable for two-way energy transmission. When there is a drag on motor 40, the block 1' works as a rectifier, the block 1 works as an inverter and the energy of the network drives the motor 40 with a speed corresponding to the selected frequency. When the motor 40 operates as a generator on being overdriven by an external torque through a power-transmission system connected to the motor, the block 1 converts the three-phase energy derived from the braking power of the motor 40 into direct-current power. Block 1' works as an inverter translating this DC power into AC power of frequency and phase similar to that of the network which is returned to the latter.

By means of the circuitry shown in FIG. 11, three-phase AC motors can be operated from a three-phase AC network as if they were DC motors supplied from a DC network because of the availability of continuous speed and power control and of the power-recuperating braking mode of operation. Since the waveform of the energy returned to the network is the same as that of the sinusoidal current driven through the motor by the energizing circuit, the usual energy shock of thyristor rectifiers is eliminated.

We claim:

1. In a process for energizing a load with an output current generally conforming to a control voltage by generating pairs of voltage pulses of opposite polarity in a succession of recurrence periods, the pulses of each pair having a relative width depending on said control voltage, by way of a first and a second circuit branch extending in series with said load between respective terminals of a balanced power supply and a neutral point thereof, said first circuit branch including a first main thyristor in antiparallel relationship with a first diode, said second circuit branch including a second main thyristor in antiparallel relationship with a second diode, said main thyristors being maintained conductive by trains of firing pulses received during respective first and second intervals spaced apart within each recurrence period whose relative durations are a function of said control voltage, conduction of said first main thyristor being terminated at the end of said first interval by the firing of a first ancillary thyristor connected in series with a commutating capacitor and an inductance between said neutral point and a junction of said first and second circuit branches, conduction of said second main thyristor being terminated at the end of said second interval by the firing of a second ancillary thyristor connected across said first ancillary thyristor in antiparallel relationship therewith, the improvement wherein in each recurrence period said second ancillary thyristor is supplied with a train of firing pulses from the beginning of the recurrence period to an intermediate instant thereof marking the end of said first interval, said first ancillary thyristor being supplied with a train of firing pulses from said intermediate instant to the end of the recurrence period coinciding with the end of said second interval whereby said ancillary thyristors are alternately turned on in continuous succession to keep said commutating capacitor at all times operatively connected to a terminal of said power supply.

2. The improvement defined in claim 1 wherein said reccurence period coincides with a cycle of a sawtooth voltage of constant frequency and amplitude, said intermediate instant being determined by a match between said control voltage and the instantaneous value of said sawtooth voltage.

3. The improvement defined in claim 2 wherein said control voltage has an alternating component with a maximum frequency smaller than one quarter of the frequency of said sawtooth voltage.

4. The improvement defined in claim 2 wherein said power supply delivers an alternating voltage, said control voltage being branched off said power supply.

5. The improvement defined in claim 2, 3 or 4 wherein a timing pulse A is generated from said intermediate instant to the end of a rising flank of said sawtooth voltage, a timing pulse B is generated from the beginning to the end of said rising flank, and a timing pulse C is generated as a replica of said timing pulse A delayed by a small fraction of a recurrence period, said first interval being measured by a first gating signal of logical value $\bar{A} \cdot B$ derived from said timing pulses A and B, said second interval being measured by a second gating signal of logical value $B \cdot C$ derived from said timing pulses B and C, said first ancillary thyristor being supplied with firing pulses during a period measured by a third gating signal of logical value $A \cdot B$ derived from said timing pulses A and B, said second ancillary thyristor being supplied with firing pulses during a period measured by a fourth gating signal $\bar{B} + B \cdot \bar{A}$ derived from said timing pulses A and B.

6. In a converter system for producing an output current generally conforming to a control voltage, comprising a power supply having a pair of terminals balanced with respect to a neutral point, a series-resonant network including a commutating capacitor connected to said neutral point, a first circuit branch including a first main thyristor in antiparallel relationship with a first diode connected to one of said terminals, a second circuit branch including a second main thyristor in antiparallel relationship with a second diode connected to the other of said terminals, a first ancillary thyristor inserted in bucking relationship with said first main thyristor between said series-resonant network and a junction of said branches, a second ancillary thyristor antiparallel to said first ancillary thyristor inserted in bucking relationship with said second main thyristor between said series-resonant network and said junction, a generator of clock pulses establishing a sequence of recurrence periods of predetermined duration, a source of firing pulses having a cadence substantially higher than that of said clock pulses, and timing means connected to said source for transmitting said firing pulses to said thyristors during parts of each recurrence period determined by said control voltage to generate in each recurrence period a pair of voltage pulses of opposite polarity having a relative width depending on the instantaneous magnitude of said control voltage, said series-resonant network and said thyristors forming part of a commutation circuit connected to a load circuit, the improvement wherein said timing means comprises logical circuitry responsive to said clock pulses and said control voltage for transmitting said firing pulses to said second ancillary thyristor from the beginning of each recurrence period to an intermediate instant determined by said control voltage and transmitting said firing pulses to said first ancillary thyristor from said intermediate instant to the end of each recurrence period, with transmission of said firing pulses to said first main thyristor starting after the beginning of each recurrence period and terminating at said intermediate instant whereas transmission of said firing pulses to said second main thyristor starts after said intermediate instant and terminates at the end of each recurrence period whereby said ancillary thyristors are alternately turned on in continuous succession to keep said commutating capacitor at all times operatively connected to a terminal of said power supply.

7. The improvement defined in claim 6 wherein said generator of clock pulses is a sawtooth oscillator, said timing means further comprising comparison means connected to said oscillator and to a control-voltage source for establishing said intermediate instant whenever a rising flank of the output of said sawtooth oscillator reaches the instantaneous value of said control voltage.

8. The improvement defined in claim 7 wherein said comparison means emits a timing pulse A from said intermediate instant to the end of said rising flank, said sawtooth oscillator emitting a timing pulse B from the beginning to the end of said rising flank, said timing means further comprising delay means connected to said comparison means for emitting a timing pulse C constituting a replica of said timing pulse A delayed by a small fraction of a recurrence period, said first main thyristor, second main thyristor, first ancillary thyristor and second ancillary thyristor being connected to said source of firing pulses by way of normally blocked first, second, third and fourth gate means, respectively, said logical circuitry deriving from said timing pulses A, B and C a first gating signal of logical value $\overline{A}\cdot B$ for unblocking said first gate means, a second gating signal of logical value $B\cdot C$ for unblocking said second gate means, a third gating signal of logical $A\cdot B$ for unblocking said third gate means, and a fourth gating signal of logical value $\overline{B}+B\cdot\overline{A}$ for unblocking said fourth gate means.

9. The improvement defined in claim 7 or 8 wherein said power supply delivers an alternating voltage, said control-voltage source being a branch connection from said power supply.

10. The improvement defined in claim 9, further comprising amplitude-adjusting means in said branch connection.

11. The improvement defined in claim 7 or 8 wherein said control-voltage source is provided with frequency-varying and amplitude-adjusting means.

12. The improvement defined in claim 6, 7 or 8 wherein said power supply is a DC source, said load circuit extending between said junction and a midpoint of said DC source.

13. The improvement defined in claim 12, further comprising a pair of ancillary capacitors respectively inserted between said neutral point and said terminals.

14. The improvement defined in claim 12 wherein said load circuit includes an inductance.

15. The improvement defined in claim 12 wherein said load circuit includes a three-phase motor, said commutation circuit being one of three substantially identical commutation circuits feeding respective phases of said motor, said control voltage being supplied to said timing means from a three-phase AC source.

16. The improvement defined in claim 15, further comprising a voltage sensor connected across said power supply and control means responsive to said voltage sensor inserted in an output lead of said AC source for superimposing a DC component on one of the control-voltage phases upon detection by said voltage sensor of an overvoltage due to operation of said motor in a generator mode.

17. The improvement defined in claim 16 wherein said voltage sensor and said control means are photoelectrically coupled to each other.

18. The improvement defined in claim 15 wherein said three commutation circuits form part of a DC/AC converter feeding said motor, further comprising an AC/DC converter substantially identical with said DC/AC converter connected to the latter as said DC source, said AC/DC converter having input connections to a three-phase AC network.

19. The improvement defined in claim 18 wherein said generator of clock pulses is common to said DC/AC and AC/DC converters.

20. The improvement defined in claim 18 wherein said AC/DC converter is connected to said AC network via three phase lines including respective chokes.

21. The improvement defined in claim 20 wherein said phases lines are connected upstream of said chokes to respective branch conductors extending to said AC/DC converter as a control-voltage source therefor.

* * * * *